United States Patent
Pyötsiä et al.

(10) Patent No.: US 10,437,265 B2
(45) Date of Patent: Oct. 8, 2019

(54) PERFORMANCE MONITORING OF PUMP-VALVE SYSTEM

(71) Applicant: METSO FLOW CONTROL OY, Vantaa (FI)

(72) Inventors: Jouni Pyötsiä, Helsinki (FI); Mats Friman, Tampere (FI)

(73) Assignee: METSO FLOW CONTROL OY, Vantaa (FI)

( * ) Notice: Subject to any disclaimer, the term of this patent is extended or adjusted under 35 U.S.C. 154(b) by 169 days.

(21) Appl. No.: 15/306,417

(22) PCT Filed: Apr. 29, 2014

(86) PCT No.: PCT/FI2014/050313
§ 371 (c)(1),
(2) Date: Oct. 24, 2016

(87) PCT Pub. No.: WO2015/166132
PCT Pub. Date: Nov. 5, 2015

(65) Prior Publication Data
US 2017/0045897 A1    Feb. 16, 2017

(51) Int. Cl.
| | |
|---|---|
| G05D 7/06 | (2006.01) |
| F04D 15/00 | (2006.01) |
| G06Q 10/06 | (2012.01) |
| G06Q 50/06 | (2012.01) |
| G06Q 50/28 | (2012.01) |
| F16K 37/00 | (2006.01) |

(Continued)

(52) U.S. Cl.
CPC ........... G05D 7/0635 (2013.01); F04B 51/00 (2013.01); F04D 15/0022 (2013.01);
(Continued)

(58) Field of Classification Search
None
See application file for complete search history.

(56) References Cited

U.S. PATENT DOCUMENTS

| | | | |
|---|---|---|---|
| 7,010,393 B2* | 3/2006 | Mirsky | F04D 15/0022 417/1 |
| 2011/0081255 A1 | 4/2011 | Steger et al. | |
| 2011/0146799 A1 | 6/2011 | Kiesbauer et al. | |

FOREIGN PATENT DOCUMENTS

| | | |
|---|---|---|
| EP | 0962847 A1 | 12/1999 |
| EP | 1072795 A1 | 1/2001 |

(Continued)

OTHER PUBLICATIONS

Wu, Duqiang, Modeling and Experimental Evaluation of a Load-Sensing and Pressure Compensated Hydraulic System, University of Saskatchewan, 2003 (Year: 2003).*

(Continued)

*Primary Examiner* — Roy Y Yi
(74) *Attorney, Agent, or Firm* — Oliff PLC

(57) ABSTRACT

A pumping energy savings estimator is provided which, based on valve opening data collected for a control valve of a pump-valve system operating in an industrial process, determines an actual maximum ($\Delta p_{org}$, ~50% open) of valve operating region of the control valve of the pump-valve system. User can select a new maximum ($\Delta p_{new}$, ~70% open) of valve operating region for the control valve. Then the estimator, based on the determined actual maximum of valve operating region and the selected new maximum of valve operating region, energy saving potential ($\Delta p_{save}$) in the pump-valve system. The potential energy savings may be put into practice by replacing the original pump with a new smaller pump, or more preferably, replacing or processing the impeller of the original pump, such that the control valve will operate with the selected new optimal maximum opening of valve operating region.

15 Claims, 6 Drawing Sheets

(51) Int. Cl.
  *F04B 51/00* (2006.01)
  *G05B 19/042* (2006.01)
  *F04B 1/00* (2006.01)

(52) U.S. Cl.
  CPC ........ *F16K 37/005* (2013.01); *F16K 37/0041* (2013.01); *G05B 19/0426* (2013.01); *G05D 7/0688* (2013.01); *G06Q 10/0639* (2013.01); *G06Q 50/06* (2013.01); *G06Q 50/28* (2013.01); *Y02P 80/10* (2015.11); *Y02P 90/82* (2015.11); *Y04S 10/56* (2013.01)

(56) References Cited

FOREIGN PATENT DOCUMENTS

| | | |
|---|---|---|
| FR | 2981706 A1 | 4/2013 |
| JP | 2004-232607 A | 8/2004 |
| WO | 2011/104419 A1 | 9/2011 |

OTHER PUBLICATIONS

Gamboa et al. Improvements in Fixed-Valve Mircopump Performance through Shape Optimization of Valves, Journal of Fluids Engineering, Mar. 2005, vol. 127, 339-346 (Year: 2005).*

Lawrence et al. "The Identification of Opportunities to Improve Pump System Maintenance and REduce System Energy Losses", Annual Pulp and Paper Industry Technical Conference, pp. 139-144, 2009.

Jan. 29, 2015 International Search Report issued in International Patent Application No. PCT/FI2014/050313.

Aug. 15, 2016 International Preliminary Report on Patentability issued in International Patent Application No. PCT/FI2014/050313.

Nov. 10, 2017 Extended European Search Report issued in European Patent Application No. 14890648.0.

* cited by examiner

| Results at 64 l/s | Original | New | New/Org |
|---|---|---|---|
| RPM [1/s] | 1516 | 1219 | 80 % |
| Torque [%] | 11,3 | 8,1 | 71 % |
| Power [%] | 10,8 | 6,2 | 57 % |
| Pump head [bar] | 4,1 | 2,7 | 65 % |
| Flow max [l/s] | 90 | 72 | 80 % |
| Valve openings [%] | 41 % | 69 % | |
| 20 l/s | 21 | 23 | |
| 40 l/s | 28 | 33 | |
| 55 l/s | 35 | 43 | |
| 60 l/s | 38 | 54 | |

PERFORMANCE MONITORING OF PUMP-VALVE SYSTEM

FIELD OF THE INVENTION

The present invention relates generally to online diagnostics of a pump-valve system.

BACKGROUND OF THE INVENTION

A control valve is generally used for a continuous control of a liquid or gas flow in various pipelines and processes. In a processing industry, such as pulp and paper, oil refining, petrochemical and chemical industries, different kinds of control valves installed in a plant's pipe system control material flows in the process. A material flow may contain any fluid material, such as fluids, liquors, liquids, gases and steam.

Successful control valve sizing and selection depend on knowing the operating conditions in the system in which the control valve is to be installed. It is known that distinct information on operating conditions very seldom exists. The more assumptions one has to make on flow conditions, the less accurate the control valve sizing is going to be. A common problem is an oversized valve or pump. This means that the valve operates with openings that are too small, within a very narrow opening range and with high installed gain. A high installed gain means that even small changes in the control signal, and respectively in valve travel, effect relatively large changes in flow. To control such a loop accurately is very difficult.

Under operating conditions a control valve is part of a process pipeline. A process pipeline often includes a number of pump-valve systems wherein a pump produces a fluid pressure to provide a fluid flow in the pipeline, and the fluid flow is controlled by a throttling control valve located somewhere in the pipeline after the pump. The pumps are driven by electrical energy. Such throttling flow control means that the "extra" pressure energy produced by the pump is wasted in the throttling control valve. Therefore, it is desired to size the pump-valve system as optimally as possible in order to avoid wasting the pumping energy and to operate the control valve more optimally. A large industrial process may contain hundreds of pump-valve systems, and the amount of wasted pumping energy may be very large. For example, estimation has been presented that the annual total amount of wasted pumping energy in the process industry in Finland may be even 500 MW which would correspond to the energy production capacity of one nuclear power plant. Thus significant savings in energy and cost could be obtained by a correct sizing of the pump-valve systems. Moreover, the wrongly sized pump-valve system results in reduced control performance and control accuracy of the valve.

A process analysis during planning enables a plant design engineer to select a pump based on expected flows in a pipeline. However, actual flows in the process are impossible to predict exactly, and the actual flows typically differ from the estimated designed flows. This may result in a wrongly sized pump. Moreover, when a plant is designed, a pump dimension is often exaggerated in order to secure the operation of the plant. It is also possible to make offline analysis of the pump-valve system. However, such analysis focuses on the identification of pump and system curves and neglects variations of system curve. The analyzed operation period is typically short, while the period should be significantly long (months or years) in order to be representative because the variations in a system curve are sometimes slow, due to fouling, clogging, etc. The high number of pump-valve systems in a plant also makes it laboursome to analyse and recognise inappropriately operating pump-valve systems.

EP0962847 discloses a method and equipment for controlling a pipe network comprising piping, an inverter-controlled pump and at least two control valves. The valve position and the flow through the valve are monitored, and the rotational speed of the pump and the position of each valve are adjusted on the basis to the position and flow data received. The rotational speed of the pump is adjusted to be as low as possible but, at the same time, sufficient for maintaining the gain of the valves. The positions of the valves are adjusted to be as open as possible, the valve opening being, however, for the major part of the time, not more than a certain predetermined portion of the opening of the totally open position. As a result, the energy consumption required for the pumping is decreased and the control accuracy of the valves is increased.

This prior art approach is only applicable to few pump-systems in a plant but fails to provide an universal way to reduce the waste of pumping energy in the plant containing a high number of pump-valve systems.

WO 2011/104419A1 discloses a method for diagnosing a pump-valve system, wherein a valve opening of a control valve and a pressure difference over the control valve during normal operation of the control valve is measured. Then, based the measured valve opening data and the measured pressure data and a stored inherent valve flow coefficient (Cv) characteristic curve of the control valve, an actual pressure difference over the control valve as a function of a flow rate through the control valve, as well as an actual maximum flow rate through the control valve are determined. In another embodiment, a flow rate through a valve is measured by a flow indicator installed in the pipeline, and a based the measured valve opening data and the measured flow rate and a stored inherent valve flow coefficient (Cv) characteristic curve of the control valve, an actual pressure difference over the control valve as a function of the measured flow rate through the control valve, as well as an actual maximum flow rate through the control valve are determined. Finally in both approaches, based on the pressure difference and the actual maximum flow rate, it is possible to determine a potential reduction achievable in the pressure difference, if a pump is resized and the following control valve is adjusted accordingly. The potential reduction of the pressure difference can be reported to a user via a user interface, such as graphical user interface, web-based user interface or voice user interface, or by means of any messaging or data communication mechanism.

A problem related to this arrangement is that pressure sensors are needed at a control valve for measuring the pressure difference, or a flow sensor is needed for measuring the flow rate. Providing new control valves with pressure sensors only for this purpose is costly, and on the other hand, the arrangement is not applicable with existing control valves in a plant. Further, flow sensors are not necessarily available in all parts of the pipeline, and providing flow sensors only for this purpose is costly.

SUMMARY OF THE INVENTION

An object of the present invention is to simplify online diagnostics of a pump-valve system. This object of the invention is achieved by a method, a valve positioner, systems and a computer program according to the independent claims. Embodiments of the invention are disclosed in the dependent claims.

An aspect of the invention is a method for diagnosing a pump-valve system, comprising determining, based on a valve opening data collected for a control valve of a pump-valve system operating in an industrial process, an actual maximum of valve operating region of the control valve of the pump-valve system, selecting determining a new maximum of valve operating region for the control valve, and estimating, based on the determined actual maximum of valve operating region and the selected new maximum of valve operating region, energy saving potential in the pump-valve system.

In an embodiment, said estimating of the energy saving potential of the pump-valve system comprises selecting the new maximum of the valve operating region for the control valve based on the actual maximum of valve operating region of the control valve, and estimating, based on the actual valve maximum of valve operating region and the selected new maximum of valve operating region, the energy savings potential, if flow characteristics of the pump-valve system were implemented according to the selected new maximum of valve operating region.

In an embodiment, the method comprises selecting determining the new maximum of valve operating region and estimating the energy savings potential, if the actual maximum of valve operating region is below a threshold value, preferably below approximately 60%, more preferably below approximately 55%, and still more preferably below approximately 50%.

In an embodiment, the method comprises resizing a pump of the pump-valve system such that the control valve will operate approximately with the selected new maximum of valve operating region.

In an embodiment, the method comprises implementing the estimated energy saving potential by either replacing a pump of the pump-valve system with a new smaller pump, or by replacing or processing an impeller of the pump the pump-valve system, such that the control valve will operate approximately with the selected new optimal maximum of valve operating region.

In an embodiment, the method comprises resizing the pump and/or implementing the estimated energy savings potential, if the estimated energy savings potential exceeds a threshold.

In an embodiment, the method comprises collecting the valve opening data directly from a digital controller or positioner of the control valve, or collecting the valve opening data indirectly based on a control signal controlling the control valve.

In an embodiment, the method comprises sorting the collected opening data, and determining the actual maximum of valve operating region as an opening data value below which x percent of the ordered collected opening data falls, x being preferably at least 80%, more preferably at least 90%.

In an embodiment, the method comprises determining a distribution of the collected valve opening data, preferably a probability distribution, and determining the actual maximum of valve operating region as an opening data value below which the distribution contains x percent of the collected opening data, x being preferably at least 80%, more preferably at least 90%.

In an embodiment, the determining of the energy saving potential is additionally based on a ratio of a static head to a total pumping pressure of the pump-valve system, and optionally based on a ratio of dynamic piping pressure losses to the total pumping pressure.

In an embodiment, said determining of the energy saving potential of the pump-valve system comprises determining the savings potential by the following equation or an approximation thereof $$\frac{P_{save}}{P_{org}} = \frac{\Delta p_{save}}{p} = \frac{1.6 \ bar}{3.4 \ bar} = 46\%$$

wherein $\Delta p_{org}$=original differential pressure across the control valve $\Delta p_{new}$=new differential pressure across the control valve $\Delta p_p$=pressure loss due to a flow resistance of piping $\Delta p_{sh}$=static pressure head.

In an embodiment, said determining of the energy saving potential of the pump-valve system comprises determining the savings potential as $$\frac{P_{new}}{P_{org}} = \frac{(1-h_{org}^2)\left(\frac{h_{org}}{h_{new}}\right)^{2n} + h_{org}^2 + x_{sh}}{1 + x_{sh}}$$

wherein

Pnew=new pumping power

Porg=original pumping power n=2 represents an equal-percentage characteristic curve of the control valve n=1 represents a linear characteristic curve of the control valve, n=0.5 represents a quickly opening control valve hnew=selected new maximum of valve operating region of the valve horg=original maximum of valve operating region of the valve xsh=a ratio of a static head to a total pumping pressure.

In an embodiment, said determining of the energy saving potential of the pump-valve system comprises determining the energy savings potential by the following equation or an approximation thereof $$\frac{P_{new}}{P_{org}} = \frac{(1-h_{org}^2)e^{-2ln(1/\phi_c)*(h_{new}-h_{org})} + x_p\left(\frac{h_{org}}{h_{pl}}\right)^2 + x_{sh}}{(1-h_{org}^2) + x_p\left(\frac{h_{org}}{h_{pl}}\right)^2 + x_{sh}}$$

wherein hnew=selected new maximum of valve operating region of the control valve horg=original maximum of valve operating region of the control valve hpl=a planning point opening xsh=a ratio of a static head to a total pumping pressure xp=a ratio of a piping pressure loss to a total pumping pressure φ0=constant Pnew=new pumping power Porg=original pumping power.

In an embodiment, said determining of the energy saving potential of the pump-valve system comprises determining the energy savings potential by the following equation or an approximation thereof $$\frac{P_{new}}{P_{org}} = \frac{(1-h_{org}^2)\frac{h_{org}^4}{h_{new}^4} + \frac{x_p}{h_{pl}^2} + x_{sh}}{(1-h_{org}^2) + \frac{x_p}{h_{pl}^2} + x_{sh}}$$

wherein
hnew=selected new maximum of valve operating region of the control valve
horg=original maximum of valve operating region of the control valve
hpl=a planning point opening
xsh=a ratio of a static head to a total pumping pressure
xp=a ratio of a piping pressure loss to a total pumping pressure
Pnew=new pumping power
Porg=original pumping power.

In an embodiment, the method comprises
creating the distribution of the collected valve opening data by sorting the collected valve opening data into a plurality of bins, the bins representing subranges of a total valve opening range of the control valve,
the opening data value in each bin is proportional to one of 1) a number of observations of the control valve operating in the respective bin, 2) the time of the control valve operates in the respective bin, and 3) the probability of the control valve to operate in the respective bin.

In an embodiment, the method comprises
measuring a power or current consumed by an electric motor of the pump in the pump-valve system operating in said industrial process with the actual maximum of valve operating region of the control valve,
calculating, based on measured power or current consumption, the saved electric energy of the electric motor in the pump-valve system, if the control valve would operate approximately with the selected new optimal maximum of valve operating region.

In an embodiment, the method comprises
providing an energy savings estimator tool on graphical user interface, said graphical user interface displaying at least the actual maximum of valve operating region, a user selectable new maximum of valve operating region and the energy saving potential, if flow characteristics of the control valve were resized according to the user selectable new maximum of valve operating region, and preferably further displaying the actual maximum of valve operating region, preferably as a histogram.

An aspect of the invention is a valve positioner for operating a control valve, the valve positioner comprising means for implementing steps of any one of the method aspects recited above.

An aspect of the invention is an automation system for controlling a process, the automation system comprising means for implementing steps of any one of the method aspects recited above.

An aspect of the invention is a valve management system comprising means for implementing steps of any one of the method aspects recited above.

An aspect of the invention is a pump management system comprising means for implementing steps of any one of the method aspects recited above.

An aspect of the invention is a process plant comprising a plurality of pump-valve systems installed in a process, an automation system for controlling the process, and a valve management system, the process plant further comprising means for implementing method steps of any one of the method aspects recited above.

An aspect of the invention is a computer program comprising program code means adapted to perform steps of any one of the method aspects recited above when the program is run on a computer or a processor.

BRIEF DESCRIPTION OF THE DRAWINGS

The invention will now be described in greater detail by means of embodiments shown as examples and with reference to the attached drawings, in which.

EXEMPLARY EMBODIMENTS OF THE INVENTION

The present invention can be applied in diagnosis of any pump-valve system comprising a combination of a pump and at least one control valve in a process pipeline.

Figure 1:
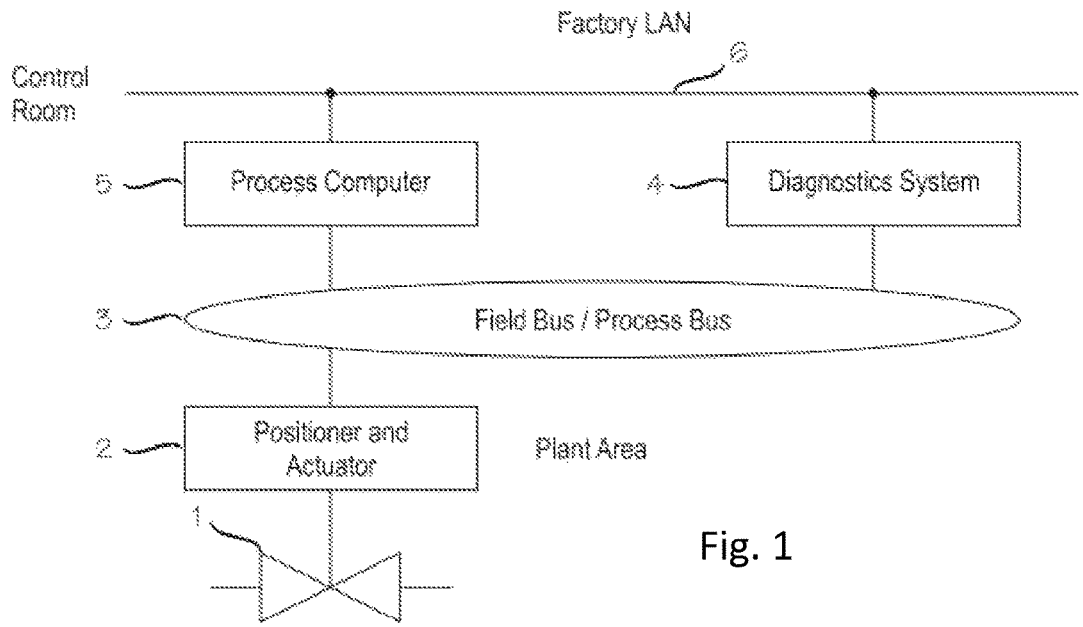
FIG. 1 shows a schematic block diagram of an exemplary process automation system and a field device management system.

FIG. 1 shows a schematic block diagram of an exemplary process automation system and a field device management system wherein the principles of the invention may be applied to a pump-valve system. The control system block 5 generally represents any and all control room computer(s)/programs and process control computer(s)/programs as well as databases in the automation system. There are various architectures for a control system. For example, the control system may be a Direct Digital Control (DDC) system or Distributed Control System (DCS), both well known in the art.

In the example of FIG. 1, only one control valve is shown, but an automation system may, however, include any number of field devices, such as control valves, often hundreds of them. There are various alternative ways to arrange the interconnection between the control system and field devices, such as control valves, in a plant area. In FIG. 1, the field/process bus 3 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Fieldbus and Profibus. However, it is to be understood that the type or implementation of the field/process bus 3 is not relevant to the present invention. The field/process bus 3 may be based on any one of the alternatives described above, or on any combination of the same, or on any other implementation.

The field devices may be managed using a field device management and diagnostics system 4. The management and diagnostics system 4 may further be connected to a local area network LAN of the factory, which allows it to communicate with the control room programs, for example. Alternatively, the field device management and diagnostics system 4 or similar functionality may be integrated into the control system 5, e.g. into control room or process control computers. The management and diagnostics system 4 may be connected to the field devices (e.g. valve positioner 2) over the field/process bus 3, as described above. For example, each field device may have a dedicated fieldbus connecting it to a HART multiplexer, which is in turn connected to the management and diagnostics system 4. The management and diagnostics system 4 may comprise a computer workstation provided an appropriate management and diagnostics program. Example of a management and diagnostics system is a computer provided with Metso FieldCare software from Metso Corp. Metso FieldCare is an universal FDT/DTM (Field Device Tool/Device Type Manager)-based software. One of the features of Metso FieldCare is on-line condition monitoring which enables to collect on-line data from field devices and provides tools for predictive maintenance planning.

Figure 2:
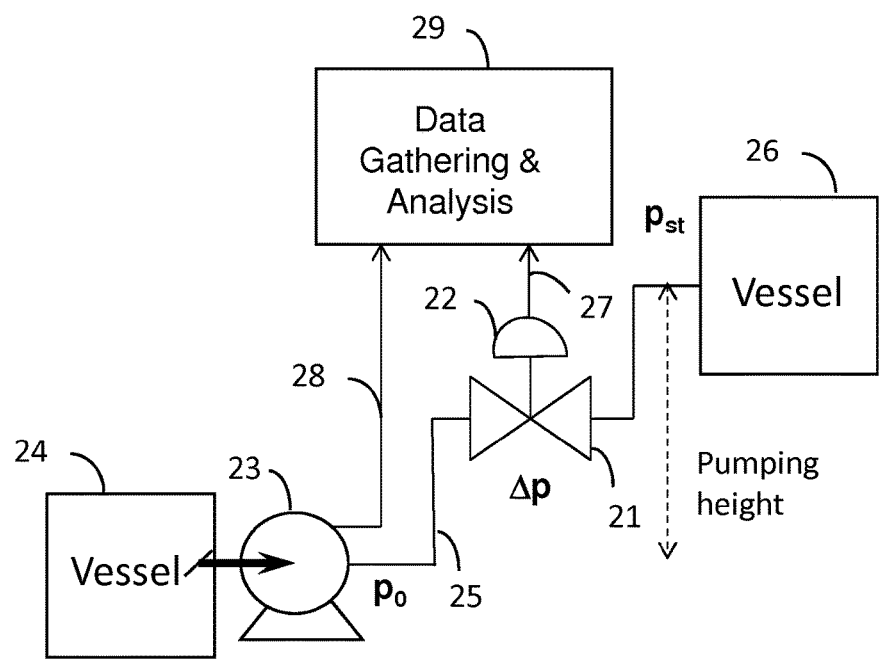
FIG. 2 illustrates an exemplary pump-valve system wherein embodiments of the present invention may be applied.

Under operating conditions a control valve is part of a process pipeline. A process pipeline often includes a number of pump-valve systems wherein a pump produces a fluid pressure to provide a fluid flow in the pipeline, and the fluid flow is controlled by a throttling control valve located somewhere in the pipeline after the pump. An exemplary pump-valve system wherein embodiments of the present invention may be applied is illustrated in FIG. 2. Such pump-valve system may be controlled and managed by the automation system illustrated in FIG. 1, or any other type of control system, or it may even be a standalone system. In the illustrated example, a pump 23 is provided to pump a flow of material to a process pipeline 25. The material source for the pump 23 may be any device or pipeline, such as an upstream vessel 24 in the example of FIG. 2. A control valve 21 is connected to a process pipeline 25 after (downstream from) the pump 23 to control the material flow of a substance in the process pipeline 25. The material flow may contain any fluid material, such as fluids, liquors, liquids, gases and steam. The pipeline 25 from the valve 21 may have any configuration, e.g. it may terminate to a downstream vessel 26 as in the example shown of FIG. 2. The control valve 21 is usually connected with an actuator, which turns the closing element of the valve to a desired position between fully open and fully closed positions. The actuator may be a pneumatic cylinder-piston device, for example. The actuator, for its part, is usually controlled by a valve positioner 22, sometimes referred to as a valve controller, which controls the position of the closing element of the control valve 21 and thus the material flow in the process according to a control signal from a controller in an automation system.

A process analysis during planning enables a plant design engineer to select a pump based on expected flows and pressures in a pipeline. However, actual flows in the process are impossible to predict exactly, and the actual flows typically differ from the estimated designed flows. This may result in a wrongly sized pump. Moreover, when a plant is designed, a pump dimension is often exaggerated in order to secure the operation of the plant. This may result in the valve operating with openings that are too small, within a very narrow opening range and with high installed gain.

Figure 3:
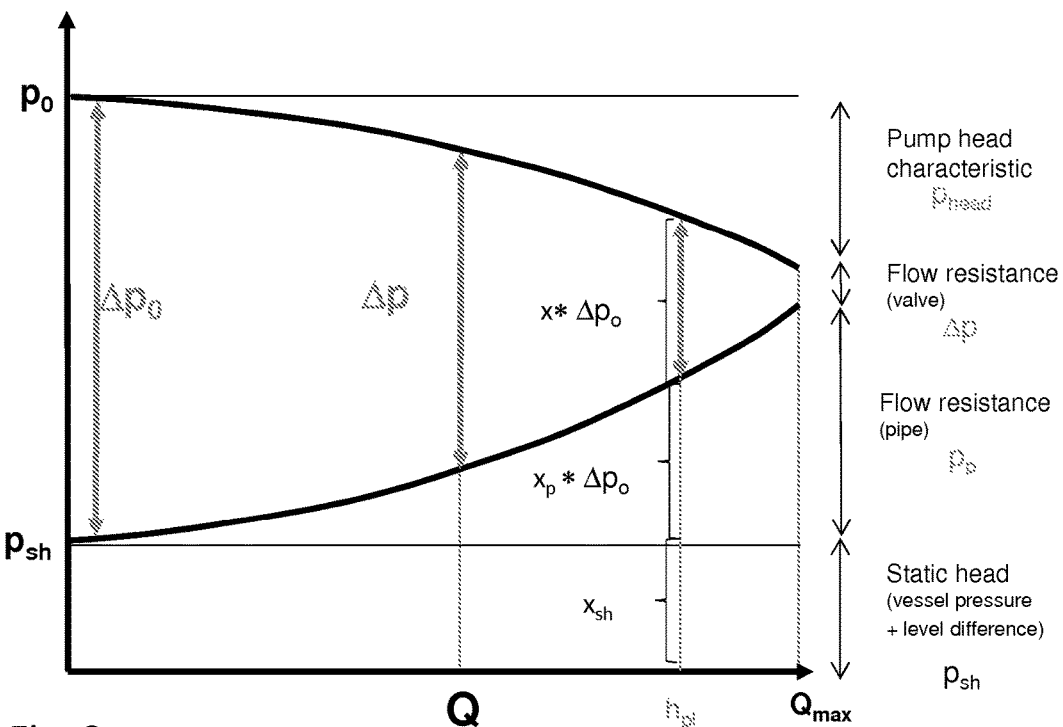
FIG. 3 illustrates an exemplary system pressure versus flow rate graph for a pump-valve system shown in FIG. 2 with the originally installed flow characteristics of the valve.

FIG. 3 illustrates an exemplary system graph for a pump-valve system shown in FIG. 2. The pump output pressure $p_0$ may be presented as follows:

$$p_0 = p_{head} + p_p + \Delta p + p_{sh}$$

There is always some static pressure head $p_{sh}$ in the system caused the pumping height (i.e. the vertical level difference between the pump level and the destination level) and a possible vessel pressure. Further, there is a pressure loss $p_p$ due to the flow resistance of the piping 25. Still further, there is a pressure difference $\Delta p$ across the control valve 21 in the pipeline. The inherent flow characteristic is the shape of a flow curve through the valve with a constant pressure drop $\Delta p$ across the valve. Basically, the differential pressure $\Delta p$ across the control valve in FIG. 3 corresponds to an installed (planned) valve flow coefficient (Cv) characteristic curve of the valve which may be stored a memory. However, when process piping is attached to the valve, the piping pressure loss $p_p$ which varies as a function of flow rate Q will cause also the valve pressure drop $\Delta p$ to vary as a function of flow rate Q, even if the pressures at the source and receiver were constant. In other words, under operating conditions the differential pressure $\Delta p$ across a valve is seldom constant in the valve travel range because dynamic pressure losses in the flow due to the flow resistance of the valve cause the valve inlet pressure to fall and the outlet pressure to rise as the flow rate Q increases. For an installed valve, the dependence of the flow rate Q on a valve opening position h, i.e. the shape of the installed flow characteristic curve, is therefore a function of the process pipeline and of the inherent flow characteristic of the valve. $\Delta p_0$ represents the original differential pressure across the valve, when the valve is fully shut. The parameters hpl, x, xp, and xsh relate to planning of the operating point of the valve, and they will be explained in more detail further below.

The pump is driven by electrical energy. By the flow theory the power taken by the pump can be calculated as follows:

$$P_{pump} = \frac{Q * p_0}{\eta_{pump}}$$

wherein $\eta_{pump}$ is the efficiency of the pump.

Figure 4:
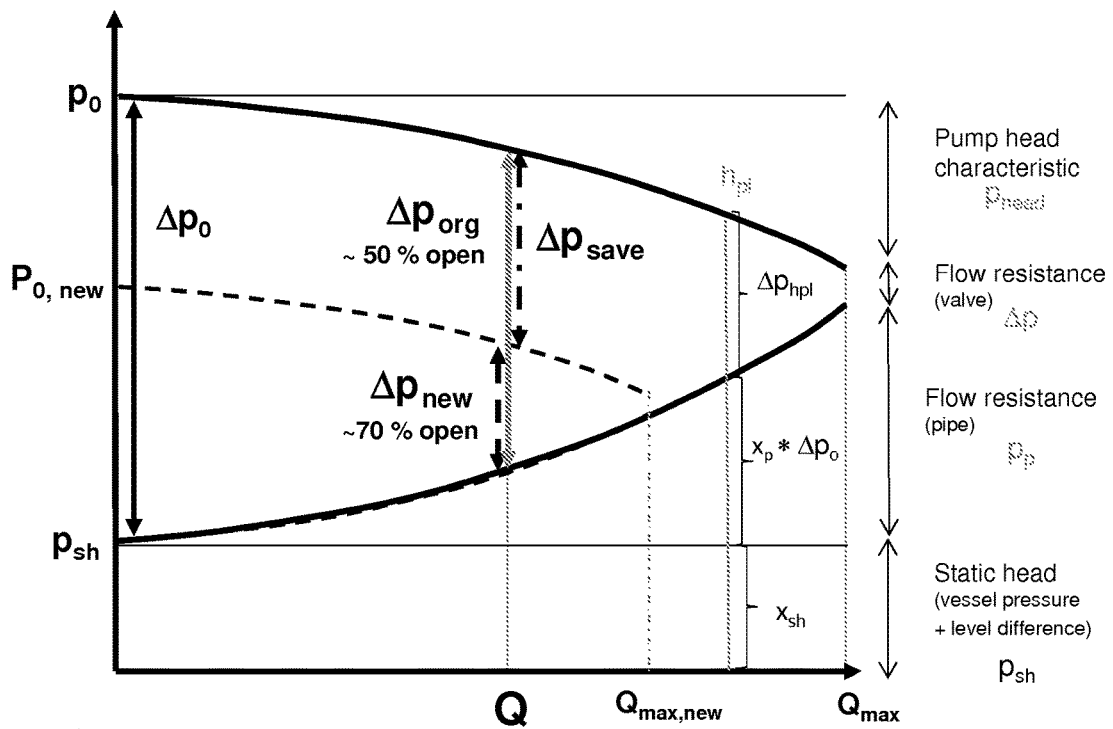
FIG. 4 illustrates an exemplary system pressure versus flow rate graphs for a pump-valve system shown in FIG. 2 with the originally installed and new flow characteristics.

Referring now to FIGS. 3 and 4, let us assume that the valve 21 is operating mainly at 50% of full opening of the valve and with a flow rate Q and a pressure difference $\Delta p_{org}$ across the control valve. Thus, it can be seen that the operating point of the pump-valve system is not optimal, since the originally planned maximum flow rate $Q_{max}$ was too high and the valve 21 as well as the pump 23 were oversized. Let us consider a new operating point wherein the the valve 21 would operate with the same flow rate Q mainly at 70% of full opening of the valve, as indicated by a dashed curves in FIG. 4. The new maximum flow rate $Q_{max,new}$ will be smaller than the original maximum flow rate $Q_{max}$, and more importantly, the new differential pressure $\Delta p_{new}$ across the control valve 21 is significantly smaller than the original differential pressure $\Delta p_{org}$. The saving (decrease) in the differential pressure will be $\Delta p_{save} = \Delta p_{org} - \Delta p_{new}$. The pump head is decreased accordingly. The power or energy saving potential can be estimated as follows:

$$\frac{P_{save}}{P_{org}} = \frac{\Delta p_{save}}{p_0}$$

It should be appreciated that in embodiments, the term maximum opening of the valve operating region does not refer to a full opening of the valve but the maximum valve opening may be a relative opening below which a predetermined portion of the recorded openings will fall. Such predetermined portion may be X % percentile, such as 80% percentile, preferably 90% percentile, for example. Thus, the maximum opening is normally smaller than the full opening of the valve.

Figure 5:
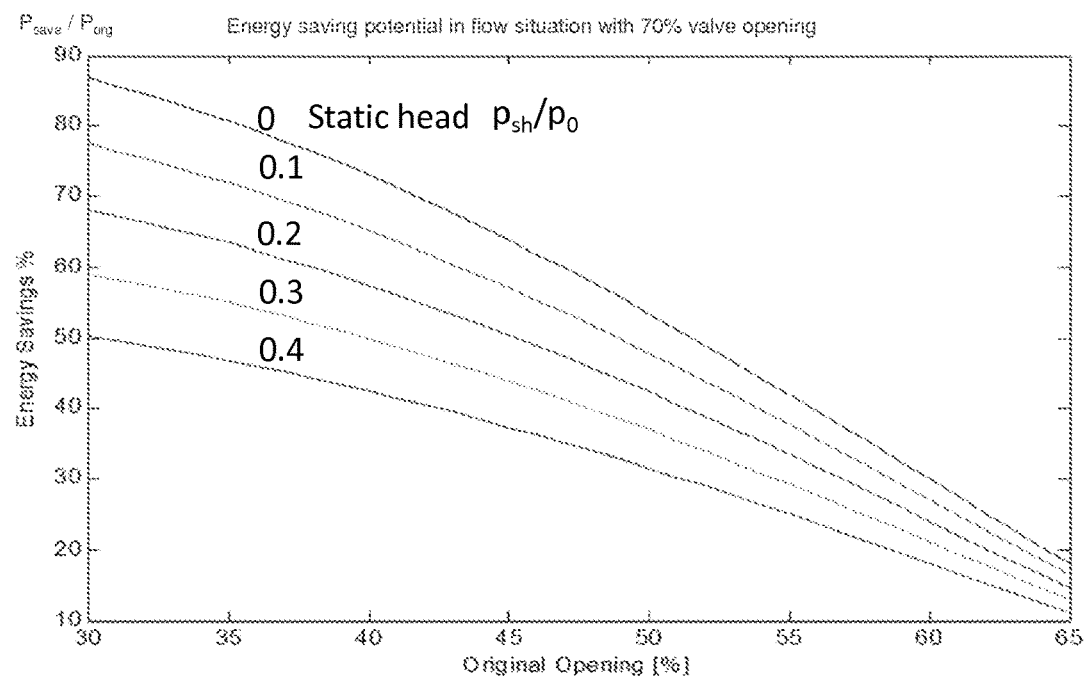
FIG. 5 illustrates an example of an energy savings potential versus the original opening.

FIG. 5 illustrates a simplified example of an energy savings potential percentage ($\Delta p_{save}/p_0$) versus the original opening percentage when the valve would operate in the same flow situation with 70% valve opening instead of the original valve opening. The approximate energy savings potential is shown with five different relative static heads ($p_{sh}/p_0$): 0, 0.1, 0.2, 0.3, and 0.4). Energy saving is highly dependent on pump head. On the other hand, the pump head is dependent on the valve opening, i.e. the differential pressure $\Delta p$ across a valve. "Extra" pressure energy is produced by the pump and wasted in the throttling control valve. Thus, a smaller pressure head with a bigger valve opening produces the same flow using less pump power. There is very potential saving case when the valve operates on small valve opening (<50%). The savings are achieved since pump is not running against the valve with small opening. Static head pressure reduces the saving potential, since it needs to be overcome and only exceeding head is used for flow dynamics. Thus in a potential energy saving case there is preferably a small static head (e.g. no or small vessel pressures). For example, if the relative static head $p_{sh}/p_0=2$ bar/8 bar=0.25, the optimizing of the valve opening from 40% to 70% will give an energy saving potential of 55%. For another example, if the relative static head $p_{sh}/p_0=10$ bar/20 bar=0.5, the optimizing of the valve opening from 40% to 70% will give an energy saving potential of 35%.

The challenge is to detect and identify those pump-valve systems among dozens or hundreds of pump-valve systems that significantly waste pumping energy, and also to evaluate the energy saving potential in the identified pump-valve system, preferably without or with minimum number of additional measurements. As noted above, additional pressure sensors are needed at a control valve for measuring the pressure difference, or a flow measurement is needed in the pipeline in the prior art arrangement disclosed in WO 2011/104419A1. Providing new control valves with pressure sensors or a flow measurement only for this purpose is costly, and on the other hand, the arrangement having pressure sensors is not applicable with existing control valves in a plant.

According embodiments of the present invention non-optimal pump-valve systems can be detected and identified based on collected data of the actual opening of the valve operating in an industrial process and optionally data on the power consumption of the electric motor of the pump, without requiring further flow or pressure measurements or sensors.

The Opening Distribution of the Valve

Data 27 on the opening of the valve may be obtained directly from the digital controller or positioner 22 of the valve 21, as schematically illustrated in FIG. 2, or by monitoring the variation of the control signal of the valve (an output signal of a process controller, not shown) cumulatively in function of time. Opening data or position data of the valve is available from majority of existing digital controllers or positioners 22. Valve control signal data is available from existing controllers or positioners, or from a process controller providing the control signal to the controller 22. No new measurements are required.

Figure 6:
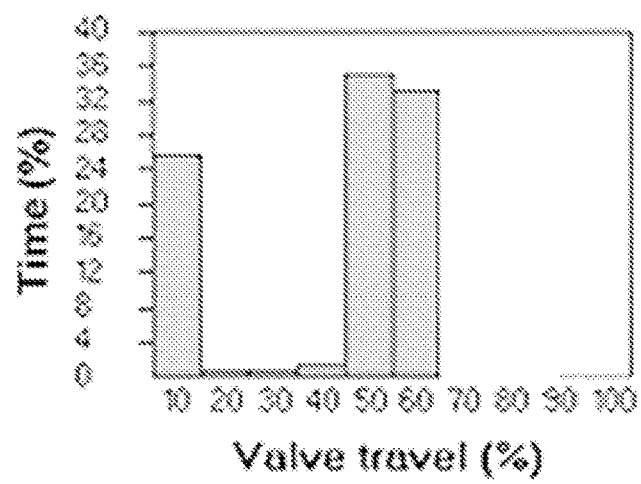
FIG. 6 illustrates an example of a distribution of opening of the valve in function of time, i.e. the valve travel versus time.

Based on a distribution of the relative opening of the valve (percentage, %, of the full opening) or from a corresponding distribution of the control signal of the valve, it is possible to determine with which openings the valve has operated over a longer period of monitoring time. An example of a distribution of opening of the valve in function of time, i.e. the valve travel versus time, is illustrated in FIG. 6. The exemplary distribution is a histogram wherein the valve travel or opening range 0-100% is divided into sub-ranges or bins 0-10, 10-20, ..., 90-100%. The height of the column in each bin corresponds to the percentage of time (%) of the total monitoring time the valve opening has been in that bin.

Let us consider an exemplary valve opening histogram (distribution) having the following data:

TABLE 1

| OpeningBinLow | OpeningBinHigh | NrOfHits |
|---|---|---|
| 0 | 10 | 1 |
| 10 | 20 | 8 |
| 20 | 30 | 42 |
| 30 | 40 | 94 |
| 40 | 50 | 86 |
| 50 | 60 | 33 |
| 60 | 70 | 5 |
| 70 | 80 | 1 |
| 80 | 90 | 1 |
| 90 | 100 | 1 |

Figure 7:
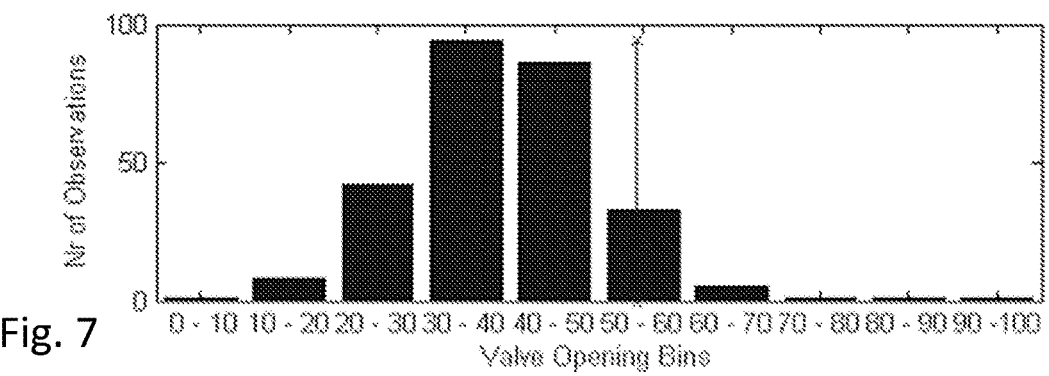
FIG. 7 illustrates another histogram showing distribution of observations in a set of valve opening bins.

The corresponding exemplary histogram is illustrated in FIG. 7. This particular histogram has been recorded with valve openings from 0% to 100%, with a bin width of 10%. The height of the column in each bin corresponds to the number of observations of the valve operating in the respective bin. It can be seen that the valve operates most of the time in the valve operates in the opening range below 50%. Thus, the pump-valve system may not be optimally dimensioned.

For the purposes of further analysis, the actual maximum valve opening of the valve operating region may be determined. In an exemplary embodiment, the maximum valve opening may be a relative opening below which a predetermined portion of the recorded openings will fall. Such predetermined portion may be at 80% of the recorded openings, preferably more than 90% of the recorded openings. In an exemplary embodiment, in order to calculate the maximum opening of valve operating region, defined as a percentile value, a probability distribution may be calculated, which is the number of hits of each bin divided by the total number of hits in the histogram. Moreover, in an exemplary embodiment, a cumulative distribution may be calculated, which is the cumulative sum of the probability distribution. The results of calculation using the values of Table 1 are shown in Table 2.

| OpeningBinLow | OpeningBinHigh | NrOfHits | ProbabilityDistr | CumProbabilityDistr |
| --- | --- | --- | --- | --- |
| 0  | 10  | 1  | 0.0036765 | 0.0036765 |
| 10 | 20  | 8  | 0.029412  | 0.033088  |
| 20 | 30  | 42 | 0.15441   | 0.1875    |
| 30 | 40  | 94 | 0.34559   | 0.53309   |
| 40 | 50  | 86 | 0.31618   | 0.84926   |
| 50 | 60  | 33 | 0.12132   | 0.97059   |
| 60 | 70  | 5  | 0.018382  | 0.98897   |
| 70 | 80  | 1  | 0.0036765 | 0.99265   |
| 80 | 90  | 1  | 0.0036765 | 0.99632   |
| 90 | 100 | 1  | 0.0036765 | 1         |

Figure 8:
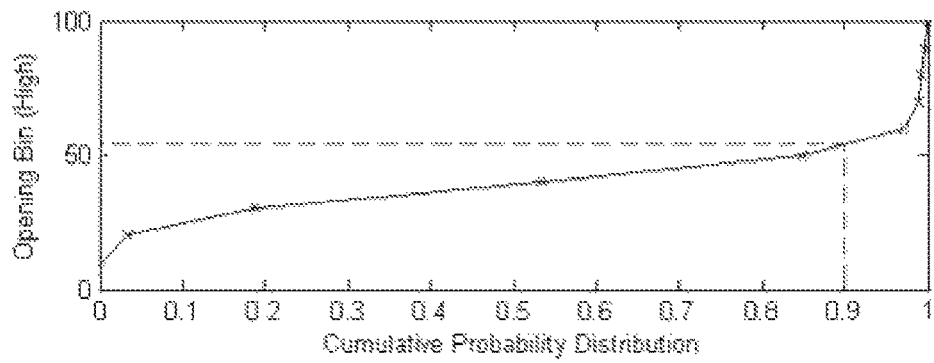
FIG. 8 illustrates an example of a cumulative probability distribution calculated for the histogram of FIG. 7.

The histogram of FIG. 7 may alternatively be shown as a histogram having the probability distribution percentile values (%) as defining the heights of the bin columns. This would correspond to the histogram shown in FIG. 6. The resulting cumulative probability distribution is depicted in FIG. 8.

The actual maximum opening of valve operating region, e.g. the 90 percentile value, may be obtained by interpolating the provided percentile value (e.g. 0.9) from the cumulative distribution vs. Valve Opening Bin (high bin limit). With the data from the table 2 we obtain maximum opening of valve operating region (90% percentile)=54.1818% of the full opening of the valve. Thus, there are potential pumping energy savings, if the new maximum opening of operating region (90% percentile) would be selected as 70%, for example, of the full opening of the valve.

In embodiments of the inventions, the recorded valve opening values h may be sorted, and the maximum opening of valve operating region may be a relative opening below which a predetermined portion of the recorded openings will fall. Such predetermined portion, or x % percentile, may be at 80% of the sorted opening values (80% percentile), preferably more than 90% of the sorted opening values (90% percentile).

The Pumping Energy

Data on the power consumption of the electric motor driving the pump may obtained by calculating it and the consumed pumping energy from a measured current (I) of the electric motor 23 in various manners well known and obvious for a person skilled in the art.

For example, a cumulative current or an average current of the electric motor may be monitored over a period of time, such as month or year. The electric power P required by the pump can be calculated from P=U*I, wherein U=nominal voltage of the motor. The amount of electric energy consumed by the pump may calculated from W=P*Δt, wherein Δt is the run time of the pump, such as the monitoring period of the current, e.g. a month.

Current measurement data, voltage measurement data or an electric power data 28 may be available from an existing electric drive (such as a frequency converter) controlling the electric motor of the pump 23, as schematically illustrated in FIG. 2. Thus, no new measurements may be required.

However, a current measurement may be arranged in various ways for an existing pump motor, if needed. For example, current transformers may be installed around current carrying conductors which supply power to the pump motor, preferably without breaking the electric circuit. The current transformers may be in form of clamp-on probes.

The power or energy consumption of the motor may be calculated at the current measurement site, whereby the power or energy consumption data 28 may be transmitted to the data gathering and analysis 29 for pumping energy savings estimation. Alternatively, the current measurement data 28 may be transmitted to the data gathering and analysis 29, and the calculations may be provided elsewhere. The data transmission may be implemented by wireless communication.

If no current or power measurement of the electric motor of pump is available, an approximate amount of electric energy consumed by the pump may be determined based on the nominal power of the pump 23, for example.

Evaluation of the Pumping Energy Savings Potential

When the initial data contains only the valve opening data and the power or energy consumption of the pump, one may have to make some assumptions for determining the energy savings potential. With good accuracy one may assume that the inherent valve flow coefficient (Cv) characteristic curves of quarter-turn rotary valves closely follow a so-called equal-percentage characteristic curve—flow capacity increases exponentially with valve travel. Equal increments of valve travel produce equal percentage changes in the existing Cv. In the case a better accuracy is desired, a polynomial approximation or tabular values may be employed.

When an equal-percentage characteristic curve is assumed, the savings potential may be calculated with the equation $$\frac{P_{new}}{P_{org}} = \frac{\Delta p_{new} + \Delta p_p + \Delta p_{sh}}{\Delta p_{org} + \Delta p_p + \Delta p_{sh}} = \frac{(1 - h_{org}^2)e^{-2ln(1/\phi_0)*(h_{new}-h_{org})} + x_p\left(\frac{h_{org}}{h_{pl}}\right)^2 + x_{sh}}{(1 - h_{org}^2) + x_p\left(\frac{h_{org}}{h_{pl}}\right)^2 + x_{sh}}$$

wherein $$\Delta p_0 = p_0 - \Delta p_{sh}$$

$$\Delta p_{new} = \Delta p_0 * (1 - h_{org}^2)e^{-2\,ln(1/*\phi 0)*(h_{new}-h_{org})}$$

$$\Delta p_{org} = \Delta p_0 * (1 - h_{org}^2)$$

$$\Delta p_p \approx \Delta p_0 * x_p \left(\frac{h_{org}}{h_{pl}}\right)^2$$

$\Delta p_{sh}$=Static head ($p_h$)

$h_{new}$=selected new maximum opening of valve operating region of the valve (e.g. 0.8)

$h_{org}$=original maximum opening of valve operating region of the valve $h_{pl}$=a planning point—the planned opening (e.g. 0.8)

$x_{sh}=\Delta p_{sh}/\Delta p_o \approx 0.25$—a ratio of a static head to a total pumping pressure (typically an estimate which can be given or assumed to be small as a default)

$x_p=\Delta p_p/\Delta p_o \approx 0.47$—a ratio of dynamic piping pressure losses to a total pumping pressure at the planning point (typically an estimate)

$\phi_0$=constant ($\phi_0 \approx 0.02$ for quarter-turn rotary valves).

The planning point $h_{pl}$ and the parameters $x_{sh}$, $x_p$, and $\Delta p_{hpl}$ are illustrated in FIG. 4. $\Delta p_{hpl}$ is the differential pressure $\Delta p$ across the valve at the planning point. Usually it may be approximated that $\Delta p_{hpl} \approx \frac{1}{3} * \Delta p$.

Simplified Evaluation of the Pumping Power Potential

If we assume that the equal-percentage characteristic curve of the valve follows the equation $$C_v(h)=k*h^2$$

we can get rid of the logarithmic and exponential functions. In that case the savings potential can be determined as follows $$\frac{P_{new}}{P_{org}} = \frac{(1-h_{org}^2)\frac{h_{org}^4}{h_{new}^4} + \frac{x_p}{h_{pl}^2} + x_{sh}}{(1-h_{org}^2) + \frac{x_p}{h_{pl}^2} + x_{sh}}$$

Further, if we assume that the sum of the pump head and the piping pressure loss $\Delta p_p$ increases in function of square of the flow rate Q, the parameters xp and hpl can be omitted, and the savings potential can be determined as $$\frac{P_{new}}{P_{org}} = \frac{(1-h_{org}^2)\frac{h_{org}^4}{h_{new}^4} + h_{org}^2 + x_{sh}}{1 + x_{sh}}$$

Generalized Evaluation of the Pumping Power Potential

If the characteristic curve of the valve is generalized into form $$C_v(h)=k*h^n$$

wherein n=2 represents the equal-percentage characteristic curve described above, n=1 represents a linear characteristic curve, and n=0.5 represents a quickly opening valve, the savings potential can be determined as $$\frac{P_{new}}{P_{org}} = \frac{(1-h_{org}^2)\left(\frac{h_{org}}{h_{new}}\right)^{2n} + h_{org}^2 + x_{sh}}{1 + x_{sh}}$$

Any of the exemplary evaluation methods described above may be utilised for determining a percentage savings potential. However, the invention is not limited to these preferred methods but also other suitable calculations and approximations can be created upon reading this specification.

The potential energy savings may be put into practice by replacing the original pump with a new smaller pump, or more preferably, replacing or processing the impeller of the original pump, such that the control valve will operate with the selected new optimal maximum opening of valve operating region. This measure will preferably be made during a maintenance shutdown of the process.

Pumping Energy Savings Estimator

Figure 9:
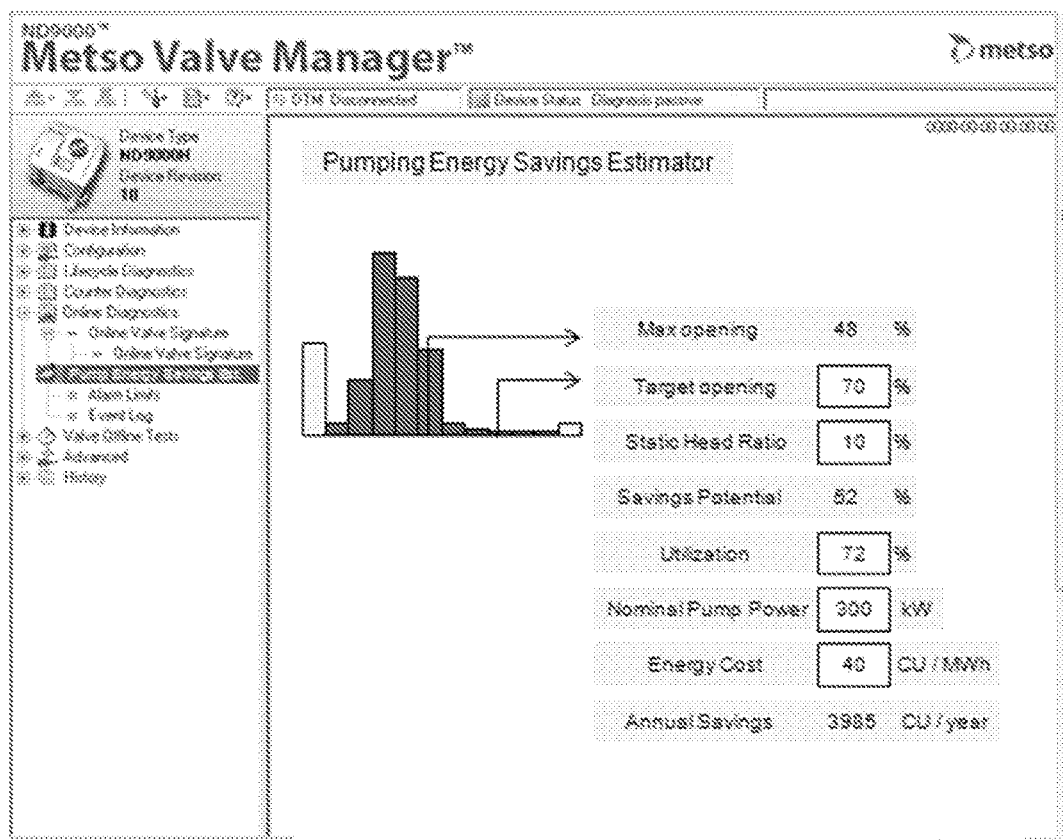
FIG. 9 illustrates an example of a pumping energy savings estimator tool.

Embodiments of the present invention can be used for providing an operator of a plant with a pumping energy savings estimator tool. The tool may provide an estimator view at a graphical user interface. An example of an estimator view is illustrated in FIG. 9. In the example, the pumping energy savings estimator is integrated into the Metso Valve Manager tool available from Metso Corp.

The tool may display a valve opening histogram that may be obtained as described above. The maximum opening of valve operating region (such as 90% percentile of the opening) corresponds to the parameter $h_{org}$ and may be obtained as described above. In the example, the max opening of valve operating region is 48% of the full opening. The target opening is a new maximum opening of valve operating region (90% percentile) $h_{new}$ to which the valve will be planned, 70%, for example, of the full opening of the valve. This parameter may be selected, e.g. inputted by the user. Static head ratio corresponds to the parameter $x_{sh}$ and may be inputted by the user. Savings potential corresponds to $P_{new}/P_{org}$ and may be calculated with the simplified savings potential equation, for example, from the parameters $h_{org}$, $h_{new}$ and $x_{sh}$.

The user may select the new maximum of valve operating region and estimate the energy savings potential conditionally, The condition may be, for example, that the actual maximum of valve operating region is below a threshold value, preferably below approximately 60%, more preferably below approximately 55%, and still more preferably below approximately 50%. With similar type of conditions, the estimator tool may indicate to the user only the pump-valve system meeting the condition.

If the monetary savings are evaluated, the user may input the average relative (percentage, %) electric power consumption Pu of the maximum power of the pump, temporal relative running timer (percentage, %) Tu of the pump (a ratio of ON time to OFF time), the nominal pump power (e.g. kW) and the energy cost per power unit (e.g. cost per MWh). Utilization U of the pump may be presented as U=Pu×Tu. Based on these parameters and the calculated savings potential, the annual monetary savings may be calculated and displayed.

Embodiments of the invention may further automatically generate reports for impact of impeller replacements on pumping performance, suggestions for magnitudes of pump impeller replacements, calculation of energy and monetary savings of suggested pump impeller replacement.

The user may implement the estimated energy savings potential in practice, e.g. resizing the pump, conditionally. The condition may be, for example, that the estimated energy savings potential exceeds a threshold, such as monetary value. Such monetary value may be based on estimated investments required for the implementation of the estimated energy saving potential in practice.

Example 1

Energy savings in a laboratory test. Test arrangement was:
Valve: Neles R1 200
Pump: Head max10 bar, Flow max 150 l/s, drive: 250 kW
Pipe system: Diameter 160-400 mm (unlinear, several reducers), length 50 m
Pumping height: 2.5 m
Flow rate 64 l/s.

The power saving potential approximated according to an embodiment of the present invention is $$\frac{P_{save}}{P_{org}} = \frac{\Delta p_{save}}{p} = \frac{1,6 \text{ bar}}{3,4 \text{ bar}} = 46\%$$

Figures 10A, 10B:
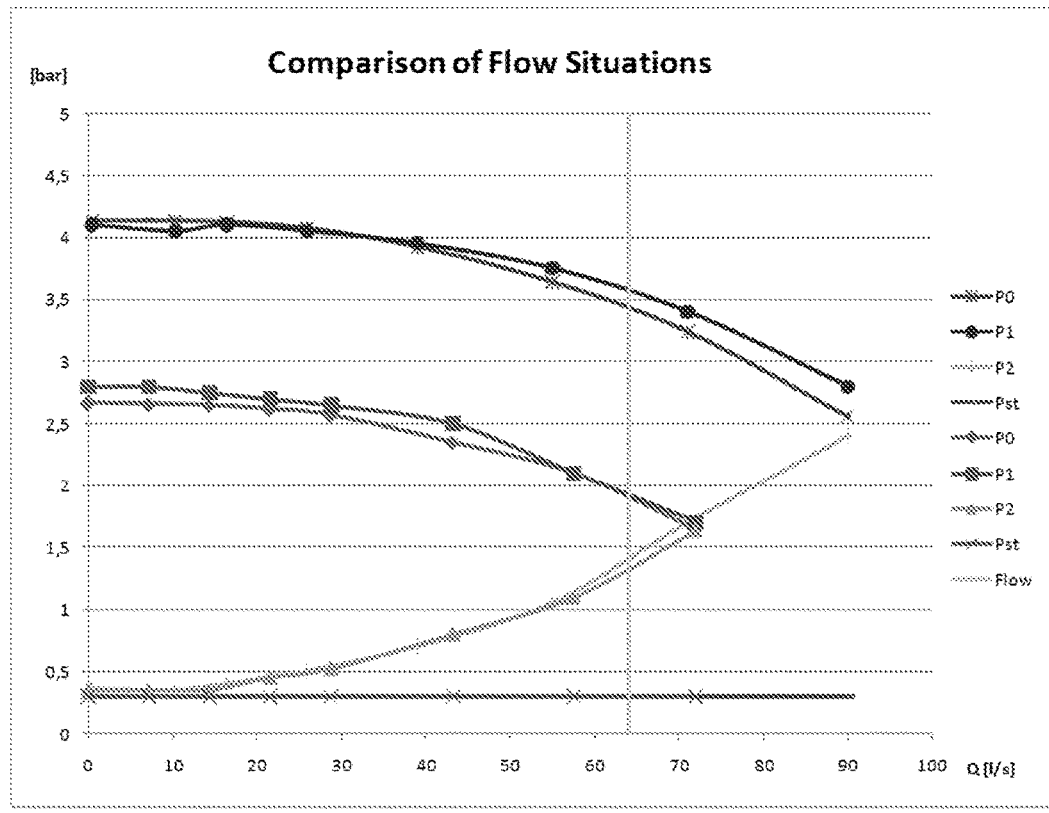
FIG. 10A illustrates an exemplary system pressure versus flow rate graphs for test pump-valve system with the originally installed and new flow characteristics.
FIG. 10B shows a table illustrating parameter values measured in the test system for both the originally installed and new flow characteristics.

The test results in the original flow situation and the optimized flow situation are depicted in FIGS. 10A and 10B. The original valve opening (90% percentile) was 41% and the new valve opening (90% percentile) was 69%.

From the data it can be concluded that by dropping the pump head from 4.1 to 2.7 bar, the same flow (64 l/s) was achieved with 43% power savings. Thus, the power saving estimation was quite accurate. Pump head was reduced by reducing rotation speed of the pump and required electric power was recorded from a frequency converter display.

Figure 11:
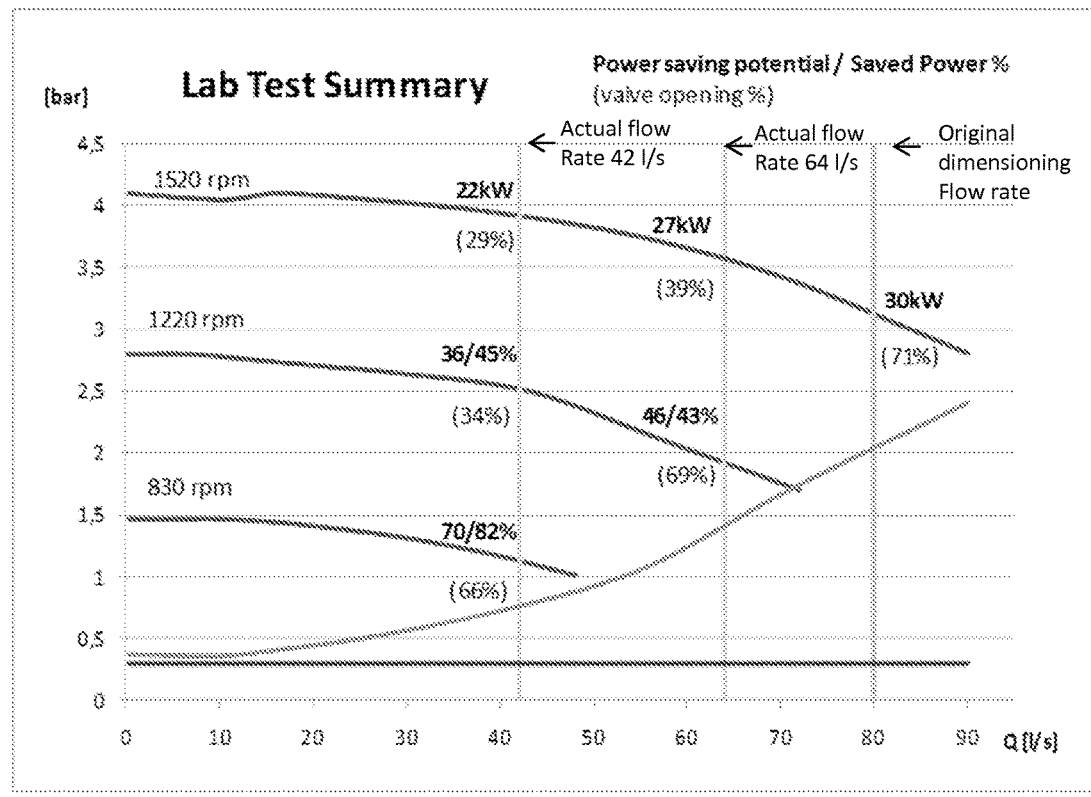
FIG. 11 depicts a laboratory test summary for different flow rates and rotation speeds.

FIG. 11 depicts a laboratory test summary with similar comparisons for flow rates 64 l/s and 42 l/s and different rotation speeds.

The data gathering and analysis is generally represented with a function block 29 in FIG. 2. The data gathering and analysis functionality 29 may be located at the valve positioner or controller 22, at the management and diagnostics system 4, or at the automation system, or in a desired manner be distributed among these, the communication being performed over the field/process bus 3. Alternatively, the data gathering and analysis functionality 29 may be provided in a remote maintenance center, or service center, or in cloud computing service, for example by valve manufacturer, valve maintenance provider, pump manufacturer or pump maintenance provider. In preferred embodiments of the invention, the opening data is collected and at least the opening distribution is calculated in the valve positioner or controller 22. In an embodiment, also the maximum of valve operating region (e.g. the 90% percentile) is calculated in the valve positioner or controller 22. The calculated data or raw valve opening data may be transmitted or otherwise provided to the management and diagnostics system 4, or at the automation system, for further processing and displaying, e.g. using a savings estimator tool according embodiments of the invention. An example of a suitable valve positioner or controller in which embodiments of the invention may be implemented is Intelligent Valve Controller ND9000 from Metso Corp.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A method for diagnosing a pump-valve system, comprising:
    operating a control valve operating in a pump-valve system, the pump-valve system comprising a process pipeline, a pump arranged to produce a pumping pressure to provide a material flow in the pipeline, and the control valve located in the pipeline downwards from the pump to control the material flow in the pipeline;
    controlling the control valve by a digital valve positioner with a first installed operating region of the valve having a first installed maximum;
    collecting, by the digital valve positioner, valve opening data values of the control valve during the operation, a differential pressure across the control valve being inversely proportional to opening of the control valve in accordance to an inherent valve flow coefficient characteristic curve stored in a memory of the digital valve positioner;
    providing, by the digital valve positioner, a valve opening distribution of the collected valve opening data values among a plurality of subranges of a valve operating region of the control valve;
    determining, by the digital valve positioner, based on the valve opening distribution of the collected valve opening data without using flow rate or pressure measurement in the determination, an actual maximum opening of valve operating region of the control valve of the pump-valve system, the actual maximum opening being inversely proportional to a first differential pressure across the control valve and thereby to a first pumping power of the pump;
    sending the valve opening distribution and the actual maximum opening of the valve operation region over a communication bus;
    receiving the valve opening distribution and the actual maximum opening of the valve operation region by a valve-pump system performance estimator apparatus having a data processing unit and a graphical user interface;
    displaying, by the valve-pump system performance estimator apparatus, the valve opening distribution and the actual maximum opening of the valve operation region to a user via the graphical user interface;
    setting, by the valve-pump system performance estimator apparatus, a new maximum opening of valve operating region for the control valve, the new maximum opening being inversely proportional to a second differential pressure across the control valve and thereby a second pumping power of the pump;

calculating, by the valve-pump system performance estimator apparatus, based on the actual maximum opening of valve operating region and the new maximum opening of valve operating region, an estimate value which approximates a ratio of the second differential pressure to the first differential pressure across the control valve and thereby a ratio of the second pumping power to the first pumping power so that the estimate value estimates a relative reduction in the pumping power and an available energy saving potential in the pump-valve system, if the new maximum opening was configured for the control valve, without needing flow rate or pressure measurement in the estimation; and displaying, by the valve-pump system performance estimator apparatus, the estimate value to the user via the graphical user interface.

2. A system, comprising
a process control system;
a process controlled by the process control system;
a plurality of pump-valve systems installed in the process, each pump-valve system comprising:
  a process pipeline;
  a pump arranged to produce a pumping pressure to provide a material flow in the pipeline; and
  a control valve assembly located in the pipeline downwards from the pump to control the material flow in the pipeline, wherein the control valve assembly comprises:
    a control valve;
    a valve actuator; and
    a digital valve positioner configured to:
      control a valve opening of the control valve with the valve actuator;
      collect valve opening data values during an operation of the pump-valve system over a period of time, a differential pressure across the control valve being inversely proportional to opening of the control valve in accordance to an inherent valve flow coefficient characteristic curve stored in a memory of the digital valve positioner;
      provide a valve opening distribution of the collected valve opening data values among a plurality of subranges of a valve operating range and send the a valve opening distribution over a process field bus; and
      determine an actual maximum opening of the control valve as a valve opening data value below which the valve opening distribution contains a predetermined portion of the collected valve opening data values, the actual maximum opening being inversely proportional to a first differential pressure across the control valve and thereby to a first pumping power of the pump, and to optionally send the actual maximum opening over a process field bus; and
a valve-pump system performance estimator apparatus having a data processing unit and a graphical user interface, the valve-pump system performance estimator apparatus being configured to:
  receive the valve opening distribution;
  receive or determine the actual maximum opening of the valve operation region;
  display the valve opening distribution and the actual maximum opening of the valve operation region to a user via the graphical user interface;
  set a new maximum opening of valve operating region for the control valve, the new maximum opening being inversely proportional to a second differential pressure across the control valve and thereby a second pumping power of the pump;
  calculate, based on the actual maximum opening of valve operating region and the new maximum opening of valve operating region, an estimate value which approximates a ratio of the second differential pressure to the first differential pressure across the control valve and thereby a ratio of the second pumping power to the first pumping power so that the estimate value estimates a relative reduction in the pumping power and an available energy saving potential in the pump-valve system, if the new maximum opening was configured for the control valve, without needing flow rate or pressure measurement in the estimation; and
  display the estimate value to the user via the graphical user interface.

3. The system as claimed in claim 2, wherein the valve-pump system performance estimator apparatus is configured to set a new maximum opening of valve operating region for the control valve based on a user input via the graphical user interface.

4. A pump-valve system, comprising:
a process pipeline;
a pump arranged to produce a pumping pressure to provide a material flow in the pipeline; and
a control valve assembly located in the pipeline downwards from the pump to control the material flow in the pipeline, the control valve assembly further comprising:
  a control valve;
  a valve actuator; and
  a digital valve positioner configured to:
    control a valve opening of the control valve with the valve actuator;
    collect valve opening data values during an operation of the pump-valve system over a period of time, a differential pressure across the control valve being inversely proportional to opening of the control valve in accordance to an inherent valve flow coefficient characteristic curve stored in a memory of the digital valve positioner; and
    provide a valve opening distribution of the collected valve opening data values among a plurality of subranges of a valve operating range and send the a valve opening distribution over a process field bus.

5. A method for diagnosing a pump-valve system, comprising:
operating a control valve operating in a pump-valve system, the pump-valve system comprising a process pipeline, a pump arranged to produce a pumping pressure to provide a material flow in the pipeline, and the control valve located in the pipeline downwards from the pump to control the material flow in the pipeline;
transmitting, by a controller in a process control system, a control signal to the control valve over a communication bus, the control signal controlling a valve opening of the control valve within a first installed operating region of the control valve having a first installed maximum;
collecting, by a valve-pump system performance estimator apparatus having a data processing unit and a graphical user interface, indirectly based on the control signal, valve opening data values of the control valve during the operation, a differential pressure across the control valve being inversely proportional to opening of the control valve in accordance to an inherent valve flow coefficient characteristic curve;

determining, by the valve-pump system performance estimator apparatus, based on the collected valve opening data without using flow rate or pressure measurement in the determination, an actual maximum opening of valve operating region of the control valve of the pump-valve system, the actual maximum opening being inversely proportional to a first differential pressure across the control valve and thereby to a first pumping power of the pump;

setting, by the valve-pump system performance estimator apparatus, a new maximum opening of valve operating region for the control valve, the new maximum opening being inversely proportional to a second differential pressure across the control valve and thereby a second pumping power of the pump;

calculating, by the valve-pump system performance estimator apparatus, based on the actual maximum opening of valve operating region and the new maximum opening of valve operating region, an estimate value which approximates a ratio of the second differential pressure to the first differential pressure across the control valve and thereby a ratio of the second pumping power to the first pumping power so that the estimate value estimates a relative reduction in the pumping power and an available energy saving potential in the pump-valve system, if the new maximum opening was configured for the control valve, without needing flow rate or pressure measurement in the estimation; and displaying, by the valve-pump system performance estimator apparatus, the estimate value to a user via the graphical user interface.

6. The method as claimed in claim 5, wherein the step of setting comprises displaying, by the valve-pump system performance estimator apparatus, the actual maximum opening of valve operating region to the user via the graphical user interface.

7. The method as claimed in claim 5, wherein the step of setting comprises setting, by the valve-pump system performance estimator apparatus, the new maximum opening of valve operating region for the control valve based on a user input via the graphical user interface.

8. A valve-pump system performance estimator apparatus, comprising:

a data processing unit; and a graphical user interface, wherein the valve-pump system performance estimator apparatus is configured to communicate with a process control system which controls a pump-valve system including a process pipeline, a pump arranged to produce a pumping pressure to provide a material flow in the pipeline, and a control valve located in the pipeline downwards from the pump to control the material flow in the pipeline, the process control system transmitting a control signal to the control valve over a communication bus, the control signal controlling a valve opening of the control valve within a first installed operating region of the control valve having a first installed maximum, valve-pump system performance estimator apparatus is configured to collect, indirectly based on the control signal, valve opening data values of the control valve during the operation, a differential pressure across the control valve being inversely proportional to opening of the control valve in accordance to an inherent valve flow coefficient characteristic curve, valve-pump system performance estimator apparatus is configured to determine, based on the collected valve opening data without using flow rate or pressure measurement in the determination, an actual maximum opening of valve operating region of the control valve of the pump-valve system, the actual maximum opening being inversely proportional to a first differential pressure across the control valve and thereby to a first pumping power of the pump, wherein valve-pump system performance estimator apparatus is configured to set a new maximum opening of valve operating region for the control valve, the new maximum opening being inversely proportional to a second differential pressure across the control valve and thereby a second pumping power of the pump, valve-pump system performance estimator apparatus is configured to calculate, based on the actual maximum opening of valve operating region and the new maximum opening of valve operating region, an estimate value which approximates a ratio of the second differential pressure to the first differential pressure across the control valve and thereby a ratio of the second pumping power to the first pumping power so that the estimate value estimates a relative reduction in the pumping power and an available energy saving potential in the pump-valve system, if the new maximum opening was configured for the control valve, without needing flow rate or pressure measurement in the estimation, and valve-pump system performance estimator apparatus is configured to display, the estimate value to a user via the graphical user interface.

9. The valve-pump system performance estimator apparatus as claimed in claim 8, wherein the valve-pump system performance estimator apparatus is configured to set the new maximum opening of valve operating region for the control valve based on a user input via the graphical user interface.

10. The valve-pump system performance estimator apparatus as claimed in claim 8, wherein the valve-pump system performance estimator apparatus is configured to display the actual maximum opening of valve operating region to the user via the graphical user interface.

11. The method according to claim 1, comprising the calculating of the estimate value is additionally based on a ratio of a static head to a total pumping pressure of the pump-valve system, and optionally additionally based on a ratio of dynamic piping pressure losses to the total pumping pressure.

12. The method according to claim 1, wherein said calculating of the estimate value estimating the energy saving potential of the pump-valve system comprises determining the savings potential by the following equation or an approximation thereof $$\frac{P_{new}}{P_{org}} = \frac{\Delta p_{new} + \Delta p_p + \Delta p_{sh}}{\Delta p_{org} + \Delta p_p + \Delta p_{sh}}$$

wherein $\Delta p_{org}$=original differential pressure across the control valve $\Delta p_{new}$=new differential pressure across the control valve $\Delta p_p$=pressure loss due to a flow resistance of piping $\Delta p_{sh}$=static pressure head.

13. The method according to claim 1, wherein said determining of the energy saving potential of the pump-valve system comprises determining the savings potential as $$\frac{P_{new}}{P_{org}} = \frac{(1 - h_{org}^2)\left(\frac{h_{org}}{h_{new}}\right)^{2n} + h_{org}^2 + x_{sh}}{1 + x_{sh}}$$

wherein
Pnew=new pumping power
Porg=original pumping power
n=2 represents an equal-percentage characteristic curve of the control valve
n=1 represents a linear characteristic curve of the control valve,
n=0.5 represents a quickly opening control valve
hnew=new maximum of valve operating region of the valve
horg=original maximum of valve operating region of the valve
xsh=a ratio of a static head to a total pumping pressure.

14. The method according to claim 1, wherein said calculation of the estimate value that estimates a relative reduction in the pumping power and the available energy saving potential of the pump-valve system comprises calculating estimate value by the following equation or an approximation thereof $$\frac{P_{new}}{P_{org}} = \frac{(1 - h_{org}^2)e^{-2\ln(1/\phi_0)*(h_{new}-h_{org})} + x_p\left(\frac{h_{org}}{h_{pl}}\right)^2 + x_{sh}}{(1 - h_{org}^2) + x_p\left(\frac{h_{org}}{h_{pl}}\right)^2 + x_{sh}}$$

wherein
hnew=new maximum of valve operating region of the control valve
horg=original maximum of valve operating region of the control valve
hpl=a planning point opening
xsh=a ratio of a static head to a total pumping pressure
xp=a ratio of a piping pressure loss to a total pumping pressure
φ0=constant
Pnew=new pumping power
Porg=original pumping power.

15. The method according to claim 1, wherein said calculation of the estimate value that estimates a relative reduction in the pumping power and the available energy saving potential of the pump-valve system comprises calculating the estimate value by the following equation or an approximation thereof $$\frac{P_{new}}{P_{org}} = \frac{(1 - h_{org}^2)\frac{h_{org}^4}{h_{new}^4} + \frac{x_p}{h_{pl}^2} + x_{sh}}{(1 - h_{org}^2) + \frac{x_p}{h_{pl}^2} + x_{sh}}$$

wherein
hnew=new maximum of valve operating region of the control valve
horg=original maximum of valve operating region of the control valve
hpl=a planning point opening
xsh=a ratio of a static head to a total pumping pressure
xp=a ratio of a piping pressure loss to a total pumping pressure
Pnew=new pumping power
Porg=original pumping power.

\* \* \* \* \*